May 7, 1968     C. K. BATH ET AL     3,381,731

FOOD PRODUCT PERFORATING AND SLICING APPARATUS

Filed April 18, 1966     2 Sheets-Sheet 1

INVENTORS
CLIFFORD K. BATH
ROY M. SPANGLER
BY Paul Lempel
ATTORNEY.

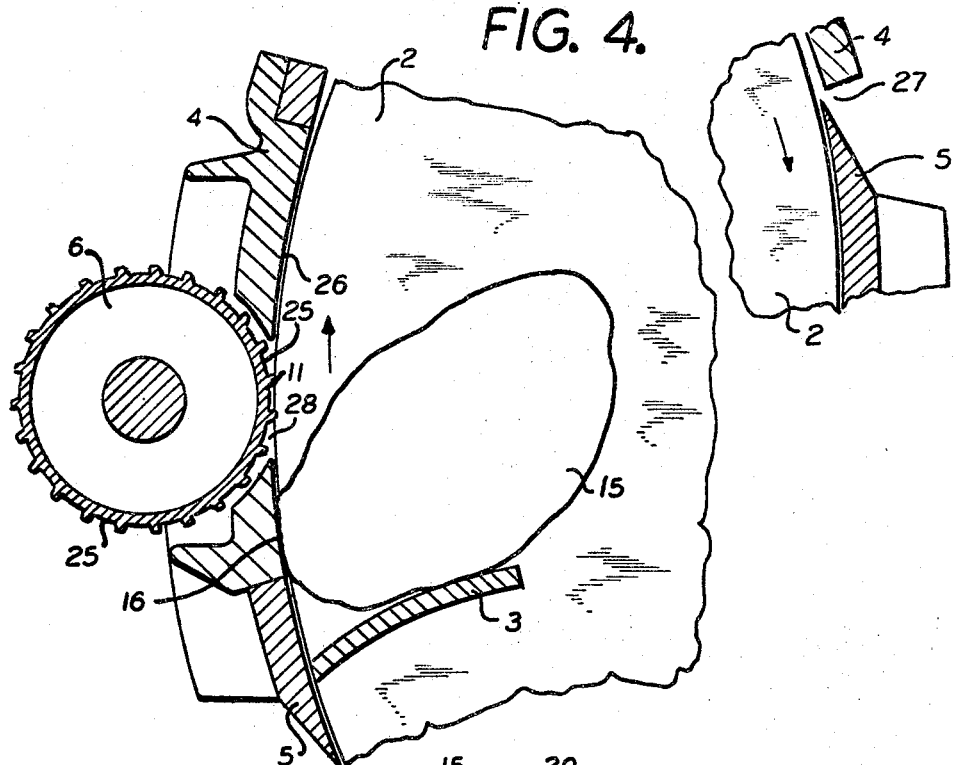

United States Patent Office 3,381,731
Patented May 7, 1968

3,381,731
FOOD PRODUCT PERFORATING AND
SLICING APPARATUS
Clifford K. Bath, Berwick, and Roy M. Spangler, Wapwallopen, Pa., assignors to Wise Potato Chip Co., Berwick, Pa., a corporation of Pennsylvania
Filed Apr. 18, 1966, Ser. No. 543,216
4 Claims. (Cl. 146—56)

This invention relates to an apparatus and method for automatically perforating and slicing food products. Such food products may subsequently be prepared for ingestion, as for example by deep-fat frying. The invention will be described in connection with perforating and slicing raw potatoes preparatory to deep-fat frying to make "potato chips."

Food slicing machines are well known in the food processing art, as for example, the Urschel type machine. The latter type of machine comprises a series of stationary, vertically mounted knife edges and rotatable impeller blades. Potatoes or other food products are rotated by the impeller blades and sliced by the knives as the food product is forced past the knife edge. Centrifugal force caused the food product to move towards the periphery of the assembly and thereby against the blades. Such an apparatus is more fully described in Patent No. 3,139,128 to Urschel et al. and reference to this patent is expressly made. Other food slicing machines comprise rotatable surfaces in a horizontal plane having protruding knife edges therein. Stationary retaining means are used to hold the food product stationary on the rotating horizontal surface which contains the knife edge. The food product is thereby sliced by movement of the knife edge containing surface.

In cases where the sliced food product is further treated as by deep-fat frying, it has been found that the fried "chip" has a tendency to blister or bubble during the frying operation. The blistered "chip" is structurally weakest at the blister area and even slight pressure causes crumbling. This causes crumbs and waste of product resulting in economic loss. Further, the blistered and "crumbly" product is unsightly to the consumer. It is believed that blistering is primarily due to moisture in the food product which has boiled during the frying process and is prevented from escaping from the inner portion of the food product. The pressure increased to the point where the walls of the food product swell and are caused to rupture; this causes the blister effect described.

In order to avoid this problem and make a solid, non-blistered fried chip, it has been found that food products which have been punctured or perforated with small holes, effectively prevents blistering during the frying process, as for example, in making a potato chip. Perforation of food products has been accomplished by passing sliced food products through perforating mechanisms. This system has limitations in that the sliced products are easily broken, and further tends to clog or block the perforating mechanisms involved.

The present invention provides an apparatus which perforates food products prior to their being sliced and said apparatus is integrally associated with the slicing mechanism. The limitations of the prior art are thus, substantially overcome.

Briefly stated, the instant invention is an apparatus which comprises rotatable perforating rollers positioned to cause contact between the unsliced food product and the slicing blades immediately after the unsliced food product has contacted the roller and has been perforated thereby. The perforating rollers, further, rotate at substantially the same peripheral velocity as the velocity of the food product which contacts said rollers. In other words, the relative velocity between the periphery of the rotating perforating roller and the food product is substantially zero. This prevents tearing or ripping of the food product as it is being punctured. The invention also contemplates the method described.

In order to more clearly describe the instant invention, and the advantages thereof, it will be further described in connection with the preferred embodiments shown in the drawings.

FIG. 4 is a partial vertical section taken through the periphery of the perforating and slicing apparatus as embodied in an Urschel slicing apparatus.

FIG. 5 is a cutaway perspective view of a second embodiment of this invention showing rotatable surfaces in the horizontal plane and the perforating rollers and knife edges therein.

Figure 1:
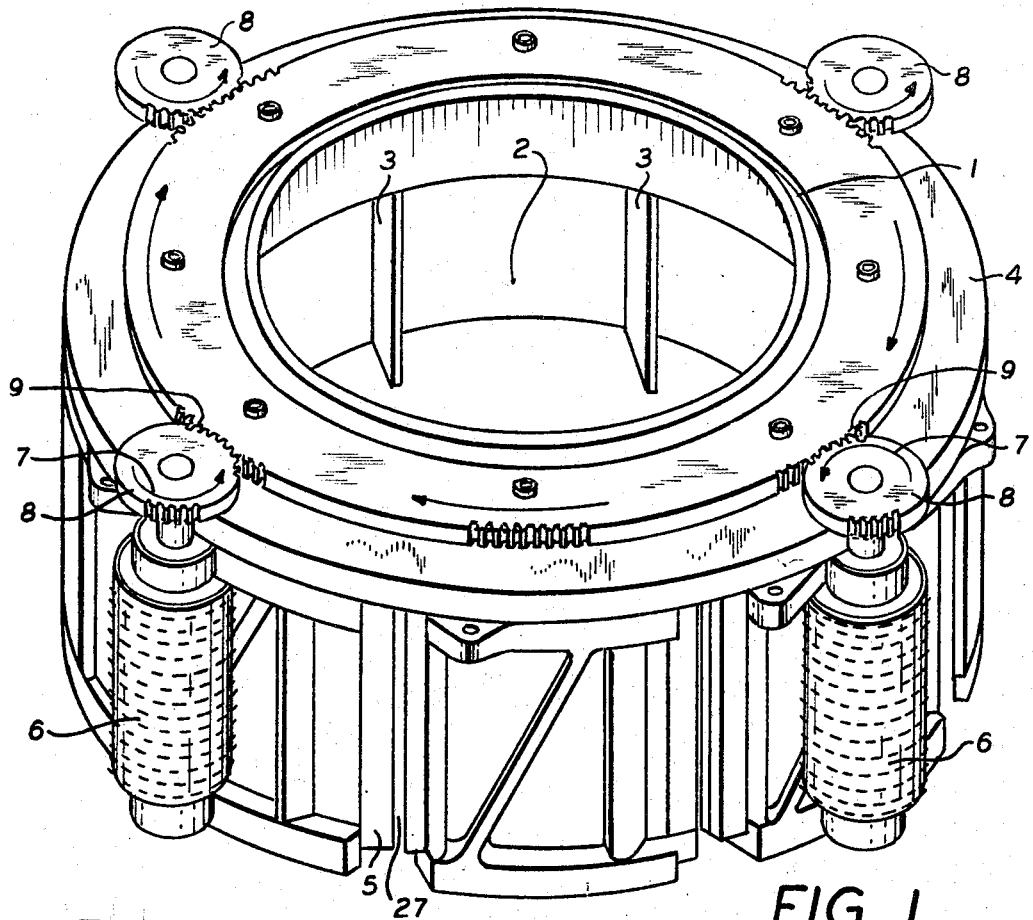
FIG. 1 is an enlarged perspective view of the perforating and slicing assembly as embodied in an Urschel slicing apparatus.

Referring now to the figures, in FIG. 1 numeral 1 designates a rotatable impeller unit which is driven (by means not shown) in the direction of the arrows. Food products, such as potatoes, are put into the cavity storage area 2 thereby being caused to move in a rotational direction by the movement of rotatable impeller unit 1. Impeller blades 3 are provided in order to prevent the food product from slipping back during rotation. Stationary slicing head assembly 4 has mounted thereon vertical slicing blades 5, only one of which is shown. Mounted on slicing head assembly 4 are also rotatable perforating rollers 6 which are geared 7 to rotatable impeller unit 1 by means of gears 8 and 9. The diameter of gear 8 is substantially the same as the diameter of the body of perforating rollers 6. This causes rotatable perforating rollers 6 to have a peripheral velocity substantially the same as the peripheral velocity of rotatable impeller unit 1. The sliced product passes through opening 27.

Figure 2:
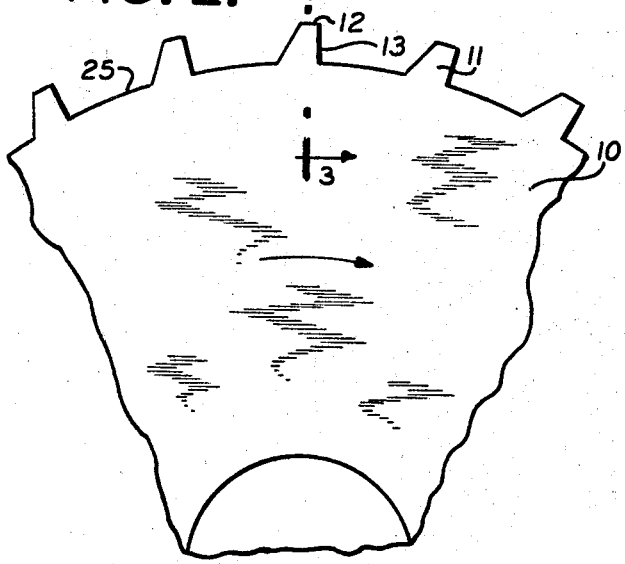
FIG. 2 is a partial view of the perforating blades.

In FIG. 2 numeral 10 represents the body of a perforating blade member and 11 is the protruding perforating portion. The curved arrow represents the preferred direction of rotation for this configuration of protruding perforating portion 11. Protruding blade edges 12 cut into the food product after the food product has been engaged by leading edge 13 of protruding perforating portion 11.

Figure 3:
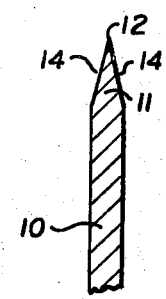
FIG. 3 is a partial sectional view taken through the perforating blades in cut 3—3.

FIG. 3 shows protruding perforating portion 11 of blade member 10 in section. Portion 11 is shown as tapering 14 which leads to top edge 12.

FIG. 4 shows a partial detail of the operational steps of the apparatus of this invention whereby a potato 15 in cavity storage area 2 is rotatably moved by impeller 3 in a direction in accordance with the arrows shown. The potato shown has been sliced by slicing blade 5 along line 16. The sliced fragment (not shown) has passed through opening 27. The potato, as shown, is being moved into a position proximate to rotatable perforating roller 6 where it will be perforated to a depth of approximately the thickness of a sliced fragment.

Perforating rollers 6 protrude through openings 28 in slicing head assembly 4 for a length sufficient to permit protruding perforating portion 11 of perforating blade member 10 to cut into potato 15 to a depth of approximately a thickness of one food product fragment slice.

It is therefore readily understood that a potato or other food product is perforated to a thickness of about the thickness of one slice and subsequent to the perforation operation, the rotational movement of rotatable impeller unit 1 carries the perforated potato past and against stationary vertical slicing blade 5 where the potato is sliced at a thickness of about the perforation thereinto. The sliced fragment of perforated potato is passed out (not shown) through opening 27 for further processing. The further processing elements are not shown.

FIG. 5 represents another embodiment of this invention wherein horizontal rotatable plate 17 contains horizontal slicing blades 18 and horizontal rotatable perforating rollers 6. Planer walls 19 are stationary and contain impeller blades 20 positioned in a general radial direction thereby acting as a brake or stopping bar for the food product 15 shown in dotted form. Rotatable perforating roll 6 is caused to rotate by interaction of gears 21 and 22. Horizontal rotatable plate 17 is caused to rotate in the direction shown by the arrow by any convenient means (means not shown). Gears 21 are axially connected to horizontal rotatable perforating rollers 6. Gear 22 is on the underportion of planer walls 19. Gears 21 and 22 intermesh during rotation of plate 17 thereby causing horizontal rotatable perforating rollers 6 to rotate. In this embodiment, the gear ratio is such that the peripheral velocity of horizontal rotatable perforating rollers 6 is substantially equal to the average peripheral velocity at a radial distance shown between points A and B. In one modification of this structure, rollers 6 could be rotated by a gearing directly to the drive mechanism of plate 17. In any case, the velocities are as stated above.

The perforating blades on the rotatable perforating rollers may take the form of any conventional piercing instrument, the preferred form being blade-like as shown in FIGS. 2 and 3. Other shapes include needles and conical dimensions, for example.

Important to note is that the surface of rotatable perforating rollers 6, shown as numeral 25, is substantially tangential to the surface of slicing head assembly 4 or horizontal rotatable plate 17, in either case, the surface against which the food product comes in contact. This is clearly shown in FIG. 4 where surface 25 is shown to be tangential with surfaces 26 and with the sliced surface 16 of potato 15. In FIG. 5, the comparable surface 25 in horizontal rotatable perforating roller 6 is substantially tangential to plate 17. In both embodiments protruding perforating portion 11 extends beyond the line of tangency thereby causing perforations in the food product up to a thickness of about the next slice therefrom.

Standard parts are incorporated in the embodiments of FIGS. 1 and 5, however, the sequential order of mechanical parts is critical in order that the food product fragment which is sliced from a bulk portion of the food product be preperforated or punctured by the rollers as shown and herein described.

Not shown are conventional adjusting mechanisms which can be incorporated to raise or lower, or move in other directions the various parts of the apparatus as is necessary to achieve optimum operating results.

It will be understood that it is intended to cover all changes and modifications of the examples of the invention herein chosen for the purpose of illustration which do not constitute departures from the spirit and scope of the invention.

We claim:
1. An apparatus for automatically perforating and slicing food products, comprising rotatable means for receiving the products, perforating means operatively associated with said rotatable means, means for rotating said rotatable means and said perforating means, means for slicing said product, and impeller means for guiding said product into said slicing means, said perforating means positioned before said slicing means whereby perforated slices are removed from said product.

2. The apparatus of claim 1, wherein said perforating means is controlled to rotate at peripheral velocity substantially the same as the peripheral velocity of said rotatable means at points adjacent to said perforating means.

3. The apparatus of claim 1, wherein the surface of said perforating means is substantially tangential to said rotatable means.

4. The apparatus of claim 3, wherein said perforating means comprises roller means and blade means, said surface of said roller being substantially tangential to said rotatable means, and said blade means protruding the length of approximately one thickness of a sliced fragment of said food product.

References Cited
UNITED STATES PATENTS

| | | | |
|---|---|---|---|
| 2,567,248 | 9/1951 | Stahmer | 146—78 |
| 2,715,927 | 8/1955 | Cüpper et al. | 146—125 X |
| 3,139,129 | 6/1964 | Urschel et al. | 146—78 X |

W. GRAYDON ABERCROMBIE, *Primary Examiner.*